US012374126B2

(12) United States Patent
Shen

(10) Patent No.: US 12,374,126 B2
(45) Date of Patent: Jul. 29, 2025

(54) OBSTACLE DETECTION METHOD AND APPARATUS, COMPUTER DEVICE, AND STORAGE MEDIUM

(71) Applicant: Tencent Technology (Shenzhen) Company Limited, Guangdong (CN)

(72) Inventor: Yuan Shen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 426 days.

(21) Appl. No.: 17/950,644

(22) Filed: Sep. 22, 2022

(65) Prior Publication Data

US 2023/0014874 A1   Jan. 19, 2023

Related U.S. Application Data

(63) Continuation of application No. PCT/CN2021/120162, filed on Sep. 24, 2021.

(30) Foreign Application Priority Data

Oct. 22, 2020   (CN) .......................... 202011138627.5

(51) Int. Cl.
*G06K 9/00* (2022.01)
*G06T 7/11* (2017.01)
(Continued)

(52) U.S. Cl.
CPC .............. *G06V 20/58* (2022.01); *G06T 7/11* (2017.01); *G06T 7/149* (2017.01); *G06T 7/50* (2017.01);
(Continued)

(58) Field of Classification Search
CPC ...... G06V 20/58; G06V 10/44; G06V 10/764; G06T 7/11; G06T 7/149; G06T 7/50; G06T 2207/10028; G06T 2207/30261
See application file for complete search history.

(56) References Cited

U.S. PATENT DOCUMENTS 7,741,961 B1 *   6/2010   Rafii ..................... G06T 7/70
                                                       348/148
9,892,328 B2 *   2/2018   Stein ..................... G06T 7/248
(Continued)

FOREIGN PATENT DOCUMENTS

CN           108229366 A *   6/2018   ............. G01S 17/86
CN           109084724 A      12/2018
(Continued)

OTHER PUBLICATIONS

Camera-based Semantic Enhanced Vehicle Segmentation for Planar LIDAR, Chen Fu et al., IEEE, 2018, pp. 3805-3810 (Year: 2018).*
(Continued)

*Primary Examiner* — Jayesh A Patel
(74) *Attorney, Agent, or Firm* — Crowell & Moring LLP

(57) ABSTRACT

An obstacle detection method can improve the accuracy of determining a relative positional relationship between two or more obstacles that are obstructed or obscured during automated driving. A road scene image of a road where a target vehicle is located is acquired. Obstacle recognition is performed to obtain region information and depth-of-field information corresponding to each obstacle in the road scene image. Target obstacles in an occlusion relationship and a relative depth-of-field relationship between the target obstacles are determined. A ranging result of each obstacle is acquired using a ranging apparatus corresponding to the target vehicle. An obstacle detection result of the road is determined based on the relative depth of field relationship between the target obstacles and the ranging result of each obstacle, thereby improving the accuracy of determining a positional relationship of obstructed or obscured obstacles during automated driving.

20 Claims, 6 Drawing Sheets

(51) Int. Cl.
  *G06T 7/149* (2017.01)
  *G06T 7/50* (2017.01)
  *G06V 10/44* (2022.01)
  *G06V 10/764* (2022.01)
  *G06V 20/58* (2022.01)

(52) U.S. Cl.
  CPC ............ *G06V 10/44* (2022.01); *G06V 10/764* (2022.01); *G06T 2207/10028* (2013.01); *G06T 2207/30261* (2013.01)

(56) References Cited

U.S. PATENT DOCUMENTS

| | | | |
|---|---|---|---|
| 9,959,767 | B1* | 5/2018 | Canella ................ B60K 35/80 |
| 10,137,890 | B2* | 11/2018 | Sakai ................ B60W 60/0016 |
| 11,093,801 | B2* | 8/2021 | Hashimoto .......... G06V 10/764 |
| 11,132,560 | B2* | 9/2021 | Friedmann ............ G06V 20/58 |
| 11,182,916 | B2* | 11/2021 | Yang ...................... G06V 10/70 |
| 11,704,890 | B2* | 7/2023 | Yang ...................... G06V 10/70 |
| 11,741,709 | B2* | 8/2023 | Korjus .................. G06V 20/10 382/104 |
| 2009/0240432 | A1* | 9/2009 | Osanai ................ G06V 20/584 701/300 |
| 2015/0338204 | A1* | 11/2015 | Richert .................. G06T 7/593 348/135 |
| 2017/0369051 | A1* | 12/2017 | Sakai .................... G06V 10/255 |
| 2018/0059779 | A1* | 3/2018 | Sisbot ...................... G06T 19/20 |
| 2018/0259971 | A1* | 9/2018 | Nishimura ............ B25J 9/1697 |
| 2018/0260415 | A1 | 9/2018 | Gordo Soldevila et al. |
| 2018/0268229 | A1* | 9/2018 | Nakata .................. G06V 20/58 |
| 2018/0302606 | A1* | 10/2018 | Lee ...................... H04N 13/239 |
| 2018/0330615 | A1* | 11/2018 | Yamanaka ............ G08G 1/16 |
| 2018/0357495 | A1* | 12/2018 | Watanabe .............. G06V 20/58 |
| 2018/0357783 | A1* | 12/2018 | Takahashi ................ G06T 7/00 |
| 2018/0365503 | A1* | 12/2018 | Xia ........................... G06T 7/70 |
| 2019/0212746 | A1* | 7/2019 | Cheng ................ B60W 60/001 |
| 2019/0272433 | A1* | 9/2019 | Yu .......................... G06V 20/56 |
| 2019/0286930 | A1* | 9/2019 | Han ........................ G06N 3/08 |
| 2019/0295281 | A1* | 9/2019 | Yamada ................ G06V 20/58 |
| 2020/0125865 | A1* | 4/2020 | Takahama ............... G06T 7/593 |
| 2020/0167943 | A1* | 5/2020 | Kim ........................ G06T 7/579 |
| 2020/0192365 | A1* | 6/2020 | Russell ............ B60W 30/18159 |
| 2020/0225672 | A1* | 7/2020 | Silva ........................ G06F 16/29 |
| 2020/0265247 | A1* | 8/2020 | Musk ...................... G06N 20/00 |
| 2021/0110178 | A1* | 4/2021 | Tsai .................... G06V 10/7753 |
| 2021/0134002 | A1* | 5/2021 | Yao ...................... G06V 10/255 |
| 2021/0150227 | A1* | 5/2021 | Hu ........................ G06V 20/64 |
| 2021/0279503 | A1 | 9/2021 | Qi et al. |
| 2022/0009524 | A1* | 1/2022 | Oba .................. B60W 60/0057 |

FOREIGN PATENT DOCUMENTS

| | | | | |
|---|---|---|---|---|
| CN | 109425863 | A | | 3/2019 |
| CN | 109931946 | A | | 6/2019 |
| CN | 109948497 | A | * | 6/2019 |
| CN | 110070056 | A | | 7/2019 |
| CN | 110427827 | A | * | 11/2019 ........... G06F 18/214 |
| CN | 111291809 | A | | 6/2020 |
| CN | 111339649 | A | | 6/2020 |
| CN | 111460926 | A | * | 7/2020 ......... G06K 9/00369 |
| CN | 111680554 | A | | 9/2020 |
| CN | 112417967 | A | | 2/2021 |
| EP | 3629233 | A1 | * | 4/2020 ............. G01S 17/42 |
| EP | 3882098 | A1 | * | 9/2021 ........... B60W 40/06 |
| JP | 2015-042952 | A | | 3/2015 |
| JP | 2020-167441 | A | | 10/2020 |
| WO | WO-2018138064 | A1 | * | 8/2018 ......... G06K 9/00805 |
| WO | WO-2019224162 | A1 | * | 11/2019 ......... G06K 9/00362 |
| WO | WO-2020035728 | A2 | * | 2/2020 ............. B60W 30/09 |
| WO | WO-2020083024 | A1 | * | 4/2020 ......... G06K 9/00805 |
| WO | WO-2020150904 | A1 | * | 7/2020 ......... G06K 9/00208 |
| WO | WO 2020/195936 | A1 | | 10/2020 |
| WO | WO 2021/155792 | A1 | | 8/2021 |

OTHER PUBLICATIONS

Learning Instance Occlusion for Planoptic Segmentation, Justin Lazarow et al., arXiv, 2019, pp. 1-10 (Year: 2019).*
Fusion of 3D laser Scanner and depth images for obstacle recognition in mobile applications, Sebastian Budzan et al., Elsevier, 2016, pp. 230-240 (Year: 2016).*
Part-Aware Region Proposal for Vehicle Detection in high Occlusion Environment, Weiwei Zhang et al., IEEE, 2019, pp. 100383-100393 (Year: 2019).*
Vehicle Detection and Classification using Improved Faster Region Based Convolution Neural Network, Usha Mittal. et al., IEEE, 2020, pp. 511-514 (Year: 2020).*
Towards Fully Autonomous Driving: Systems and Algorithms, Jesse Levinson et al., IEEE 2011, pp. 163-168 (Year: 2011).*
A vision-based method for on-road truck height measurement in proactive prevention of collision with overpasses and tunnels, Fei Dai et al., Elsevier, 2014, pp. 29-39 (Year: 2014).*
Ego-Motion Estimation and Moving Object Tracking using Multilayer LIDAR, Takeo Miyasaka et al., IEEE, 2009, pp. 151-156 (Year: 2009).*
Communication pursuant to Article 94(3) EPC for corresponding EP application No. 21 881 821.9 dated Aug. 1, 2024 7p.
Notification of Reasons for Refusal for corresponding Japanese application No. 2022-564312 dated Aug. 14, 2023, 3p, in Japanese language.
English language translation for Notification of Reasons for Refusal for corresponding Japanese application No. 2022-564312 dated Aug. 14, 2023, 4p.
International Search Report and Written Opinion for priority application No. PCT/CN2021/120162 dated Dec. 22, 2021, 10p, in Chinese language.
English language translation of International Search Report for priority application No. PCT/CN2021/120162 dated Dec. 22, 2021, 2p.
Extended European Search Report for corresponding application No. EP 21881821.9 dated May 22, 2023 9p.
Fu, Chen et al., "Camera-based Semantic Enhanced Vehicle Segmentation for Planar LIDAR", *IEEE, 2018 21st International Conference on Intelligent Transportation Systems (ITSC)*, Nov. 7, 2018, pp. 3805-3810, US.
Huang, Zhaojin et al., "Mask Scoring R-CNN", *IEEE, 2019 Conference on Vision and Pattern Recognition (CVPR)*, Jun. 2019, pp. 6402-6411, US.
Lazarow, Justin et al., "Learning Instance Occlusion for Panoptic Segmentation", retrieved from *Cornell University Library*, Jun. 13, 2019, pp. 1-10, US.

* cited by examiner

OBSTACLE DETECTION METHOD AND APPARATUS, COMPUTER DEVICE, AND STORAGE MEDIUM

RELATED APPLICATION

This application claims priority as a continuation to PCT/CN2021/120162, filed on Sep. 24, 2021, published as WO2022083402A1, entitled "OBSTACLE DETECTION METHOD AND APPARATUS, COMPUTER DEVICE, AND STORAGE MEDIUM," which claims priority to Chinese Patent Application No. 202011138627.5, filed on Oct. 22, 2020 and entitled "OBSTACLE DETECTION METHOD AND APPARATUS, COMPUTER DEVICE, AND STORAGE MEDIUM," each of which are incorporated herein by reference in their entirety.

FIELD OF THE TECHNOLOGY

This application relates to the field of computer technologies, and in particular, to an obstacle detection method and apparatus, a computer device, and a storage medium.

BACKGROUND OF THE DISCLOSURE

As artificial intelligence technologies develop, automated driving technologies have emerged. Automated driving technologies rely on the cooperation of artificial intelligence, visual computation, radars, monitoring apparatuses, and global positioning systems, such that a computer system can automatically and safely control motor vehicles without active input operations by human beings. Currently, distance detection may be performed on obstacles through the usage of sensors, and hazard levels of the obstacles relative to a vehicle may be determined based on distances from the obstacles to the vehicle obtained by the distance detection to avoid obstacles with a relatively high hazard level, thereby driving automatically, without necessarily requiring human input.

However, for two or more obstacles that are obstructed or obscured, a relative positional relationship between the obstacles often cannot be accurately determined in the above distance detection manner, resulting in inaccurate detection results of the obstacles.

SUMMARY

Embodiments of this application provide an obstacle detection method and apparatus, a computer device, and a storage medium, which can accurately detect obstacles.

An obstacle detection method is provided. The method is performed by a computer device. The method includes:
acquiring a road scene image of a road where a target vehicle is located;
performing obstacle recognition on the road scene image to obtain region information and depth-of-field information corresponding to each obstacle in the road scene image;
determining target obstacles in an occlusion relationship according to the region information corresponding to each obstacle, and determining a relative depth-of-field relationship between the target obstacles according to the depth-of-field information of the target obstacles;
acquiring a ranging result of each obstacle collected by a ranging apparatus corresponding to the target vehicle; and
determining, according to the relative depth-of-field relationship between the target obstacles and the ranging result of each obstacle, an obstacle detection result corresponding to the road where the target vehicle is located.

An obstacle detection apparatus is provided. The apparatus includes:
a road scene image acquisition module, configured to acquire a road scene image of a road where a target vehicle is located;
an obstacle recognition module, configured to perform obstacle recognition on the road scene image to obtain region information and depth-of-field information corresponding to each obstacle in the road scene image;
a relative depth-of-field relationship determination module, configured to: determine target obstacles in an occlusion relationship according to the region information corresponding to each obstacle, and determine a relative depth-of-field relationship between the target obstacles according to the depth-of-field information of the target obstacles;
a ranging result acquisition module, configured to acquire a ranging result of each obstacle collected by a ranging apparatus corresponding to the target vehicle; and
an obstacle detection result determination module, configured to determine, according to the relative depth-of-field relationship between the target obstacles and the ranging result of each obstacle, an obstacle detection result corresponding to the road where the target vehicle is located.

A computer device, including a memory and one or more processors, the memory storing a computer-readable instruction, and the computer-readable instruction, when executed by the processor, causing the one or more processors to perform the following operations:
acquiring a road scene image of a road where a target vehicle is located;
performing obstacle recognition on the road scene image to obtain region information and depth-of-field information corresponding to each obstacle in the road scene image;
determining target obstacles in an occlusion relationship according to the region information corresponding to each obstacle, and determining a relative depth-of-field relationship between the target obstacles according to the depth-of-field information of the target obstacles;
acquiring a ranging result of each obstacle collected by a ranging apparatus corresponding to the target vehicle; and
determining, according to the relative depth-of-field relationship between the target obstacles and the ranging result of each obstacle, an obstacle detection result corresponding to the road where the target vehicle is located.

One or more non-transitory non-volatile readable storage media storing computer-readable instructions are provided, the computer-readable instructions, when executed by one or more processors, causing the one or more processors to perform the following operations:
acquiring a road scene image of a road where a target vehicle is located;
performing obstacle recognition on the road scene image to obtain region information and depth-of-field information corresponding to each obstacle in the road scene image;
determining target obstacles in an occlusion relationship according to the region information corresponding to each obstacle, and determining a relative depth-of-field relationship between the target obstacles according to the depth-of-field information of the target obstacles;

acquiring a ranging result of each obstacle collected by a ranging apparatus corresponding to the target vehicle; and determining, according to the relative depth-of-field relationship between the target obstacles and the ranging result of each obstacle, an obstacle detection result corresponding to the road where the target vehicle is located.

Details of one or more embodiments of this application are provided in the subsequent accompanying drawings and descriptions. Other features and advantages of this application become clearer from the specification, the accompanying drawings, and the claims.

BRIEF DESCRIPTION OF THE DRAWINGS

The accompanying drawings described herein are used for providing a further understanding of this disclosure, and form part of this disclosure. The example embodiments of this application and descriptions thereof are used for explaining this disclosure, and do not constitute a limitation to this application.

DESCRIPTION OF EMBODIMENTS

The objectives, technical solutions, and advantages of this application are described in further detail below with reference to the accompanying drawings. It is to be understood that the embodiments described herein are only used for explaining this disclosure, and are not to be considered as a limitation.

Figure 1:
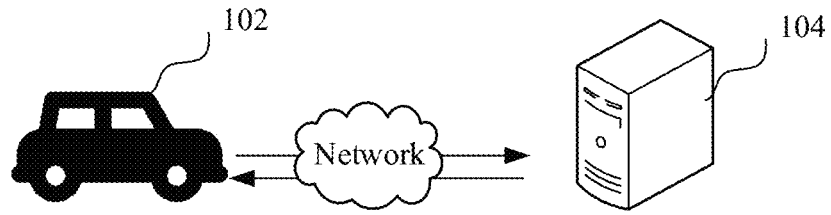
FIG. 1 is an application environment diagram of an obstacle detection method according to an example embodiment.

The benefits provided in the embodiments of this application relate to technologies such as machine learning in artificial intelligence, which are described in the following embodiments. An obstacle detection method is performed by a computer device. The method is applicable to an application environment shown in FIG. 1. A target vehicle 102 communicates with a computer device 104 through a network. The target vehicle 102 acquires a road scene image of the road where the target vehicle is located, and uploads the acquired road scene image to the computer device 104. The computer device 104 performs obstacle recognition on the road scene image of the road where the target vehicle is located when acquiring the road scene image, to obtain region information and the depth-of-field information corresponding to each obstacle in the road scene image. The computer device 104 determines target obstacles in an occlusion relationship according to the region information corresponding to each obstacle, and determines a relative depth-of-field relationship between the target obstacles according to the depth-of-field information of the target obstacles. The computer device 104 acquires a ranging result of each obstacle collected by a ranging apparatus corresponding to the target vehicle, and determines, according to the relative depth-of-field relationship between the target obstacles and the ranging result of each obstacle, an obstacle detection result corresponding to the road where the target vehicle is located. In addition, the computer device 104 may deliver the obstacle detection result to the target vehicle 102, so that the target vehicle 102 avoids the obstacles in time according to the obstacle detection result.

The target vehicle may be, but is not limited to, an autonomous vehicle. The computer device may be a terminal or a server. The terminal may be, but is not limited to, various personal computers, notebook computers, smart phones, tablet computers, and portable wearable devices. The server may be an independent physical server, a server cluster composed of a plurality of physical servers, a distributed system, or a cloud server that provides basic cloud computing services such as cloud storage, a network service, cloud communication, big data, and an artificial intelligence platform. The terminal and the server may be directly or indirectly connected through wired or wireless communication.

Figure 2:
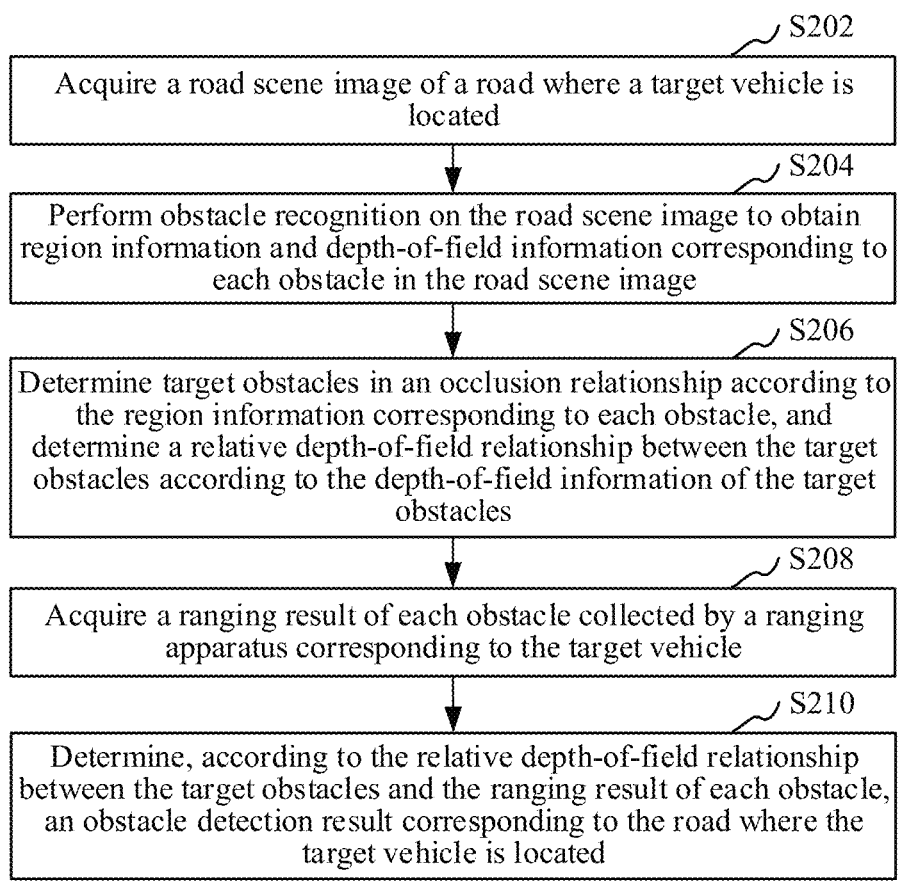
FIG. 2 is a schematic flowchart of an obstacle detection method according to an example embodiment.

In some embodiments, as shown in FIG. 2, an obstacle detection method is provided. The method is applied to the computer device in FIG. 1. Descriptions are made by using an example in which the computer device may be a terminal or a server, including the following steps:

S202: Acquire a road scene image of a road where a target vehicle is located.

The road scene image is an image obtained by collecting scene information of the road. The road scene image can reflect a surrounding environment of the target vehicle, such as lanes and obstacles, including vehicles, pedestrians, street lights, traffic signs, and the like. The road scene image may be an image captured in real time by an image capture apparatus. During travelling of the target vehicle, the road scene image is analyzed in real time to obtain an obstacle detection result corresponding to the road where the target vehicle is located, so that the target vehicle can avoid obstacles in time based on the obstacle detection result.

In some embodiments, the computer device may receive road scene images uploaded by other computer devices to obtain the road scene image of the road where the target vehicle is located. The other computer devices may be the target vehicle or an image capture device associated with the target vehicle.

When the target vehicle is in an automated driving state, after capturing the real scene image by using the image capture apparatus to obtain the scene image of the road where the target vehicle is located, the target vehicle uploads the road scene image to the computer device, so that the computer device acquires the road scene image of the road where the target vehicle is located. The image capture apparatus may be a built-in image capture apparatus of the target vehicle, or may be an external image capture apparatus associated with the target vehicle. For example, the target vehicle may be connected to an external image capture apparatus through a cable or a network. The image capture apparatus captures the image of the real scene, and transmits the captured image to the target vehicle. The built-in image capture apparatus may be a camera, and the external image capture apparatus associated with the target vehicle may be an image capture device carrying a camera, such as an unmanned aerial vehicle. In some embodiments, the camera may be a monocular camera. Correspondingly, the road scene image captured by the camera is a monocular image. The monocular image is a single image of a same scene, which may be an RGB image. In some embodiments, the camera is invoked to enable a scan mode, so as to scan in real time a target object in a field of view of the camera, and generate a road scene image in real time according to a specified frame rate. The field of view of the camera is a region where the camera can capture an image.

S204: Perform obstacle recognition on the road scene image to obtain region information and depth-of-field information corresponding to each obstacle in the road scene image.

The obstacle recognition means recognizing obstacles existing in the road scene image, including instance segmentation and depth-of-field prediction.

Instance segmentation is a task of recognizing an outline of an object at a pixel level. The instance segmentation in this application means accurately segmenting obstacles of different classes in the road scene image, classifying all pixels in the image to determine a class of each pixel, so as to obtain a plurality of pixel regions, and distinguishing different obstacles in the pixel regions of a same class, so as to obtain region information corresponding to each obstacle in the road scene image.

The depth-of-field prediction means predicting depth information of each obstacle in the road scene image, which may also be referred to as depth-of-field information. The depth-of-field information of the obstacle is a distance from the obstacle to the camera. In this application, the depth-of-field prediction means predicting depth information of each pixel in the road scene image, and predicting the depth-of-field information corresponding to each obstacle based on the depth information of each pixel and the region information corresponding to each obstacle determined through the instance segmentation.

Figure 3:
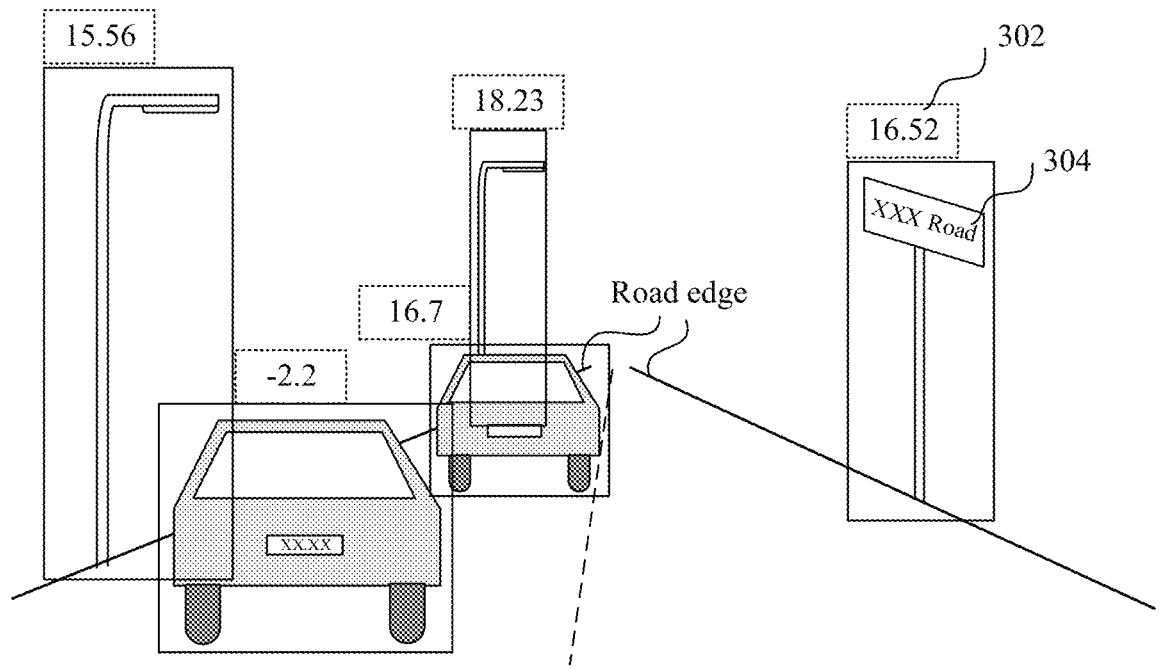
FIG. 3 is a schematic diagram of an obstacle recognition result according to an example embodiment.

FIG. 3 is a schematic diagram of an obstacle recognition result according to some embodiments. It can be seen that different obstacles correspond to different region information 302 and different depth information 304. The depth information is represented by a depth-of-field value obtained through the depth-of-field prediction. A smaller depth-of-field indicates a smaller distance from a corresponding obstacle to the target vehicle. That is to say, a relative magnitude of the depth-of-field value indicates a relative distance from the obstacle to the target vehicle.

An obstacle recognition manner may be performed in a variety of manners such that the region information and the depth-of-field information corresponding to each obstacle can be obtained by performing obstacle recognition on the road scene image.

In some embodiments, a computer device performs obstacle recognition on the road scene image according to a pre-trained obstacle recognition model, to obtain the region information and the depth-of-field information corresponding to each obstacle in the road scene image. The pre-trained obstacle recognition model may include a convolutional neural network structure. The convolutional neural network may perform operations such as convolution calculation, normalization, and activation function calculation.

In some embodiments, a method for training an obstacle recognition model may be as follows: A training sample image and a training label corresponding to the training sample image are acquired. The training label is used for labeling a class to which each pixel in the corresponding training sample image belongs and corresponding depth-of-field information. Then parameters of the obstacle recognition model are initialized. The training sample image is input to the obstacle recognition model, to obtain predicted region information and predicted depth-of-field information corresponding to obstacles. Next, for a difference between the predicted region information and the predicted depth-of-field information and the training label, the parameters of the obstacle recognition model are optimized based on a gradient descent algorithm by using a loss function. The obstacle recognition model is iteratively trained according to the above method until a training stop condition is satisfied. The training stop condition may be that an iteration number reaches a specified number, or a variation of the loss function is less than a specified threshold.

S206: Determine target obstacles in an occlusion relationship according to the region information corresponding to each obstacle, and determine a relative depth-of-field relationship between the target obstacles according to the depth-of-field information of the target obstacles.

The target obstacles are those in the obstacles in the obtained road scene image in an occlusion relationship. The occlusion relationship indicates that corresponding region information of the target obstacles in the acquired road scene image intersects. The relative depth-of-field relationship indicates a distance of the target obstacle relative to the target vehicle. It may be understood that the distances between the target obstacles in an occlusion relationship and the target vehicle are different. That is to say, the depth-of-field information of each target obstacle is different. For example, if an obstacle A obscures an obstacle B, a distance from the obstacle A to the target vehicle is less than a distance from the obstacle B to the target vehicle. That is to say, compared with the obstacle B, the obstacle A is closer to the target vehicle. Relative distance relationships between different target obstacles and the target vehicle indicate the relative depth-of-field relationship between the target obstacles.

In some embodiments, the computer device performs obstacle recognition on the road scene image according to the pre-trained obstacle recognition model, to obtain the region information and the depth-of-field information corresponding to each obstacle in the road scene image, then determines whether the region information of different obstacles intersects based on the region information corresponding to each obstacle by using the obstacle recognition model, determines the obstacles corresponding to the region information intersecting each other as the target obstacles in an occlusion relationship, and determines relative distances from the target obstacles to the target vehicle according to the depth-of-field information of the target obstacles, to obtain the relative depth-of-field relationship between the target obstacles.

The relative depth-of-field relationship between any two target obstacles may be expressed by a preset character. For example, "−1", "0", or "1" may be used to indicate the relative depth-of-field relationship between the target obstacles. When the relative depth-of-field relationship between the obstacle A and the obstacle B is "−1", it indicates that the obstacle A obscures the obstacle B, which may be denoted as "(obstacle A, obstacle B, −1)". When the relative depth-of-field relationship between the obstacle A and the obstacle B is "0", it indicates that there is no occlusion relationship between the obstacle A and the obstacle B, which may be denoted as "(obstacle A, obstacle B, 0)". When the relative depth-of-field relationship between the obstacle A and the obstacle B is "1", it indicates that the obstacle A is obscured by the obstacle B, which may be denoted as "(obstacle A, obstacle B, 1)".

Figure 4:
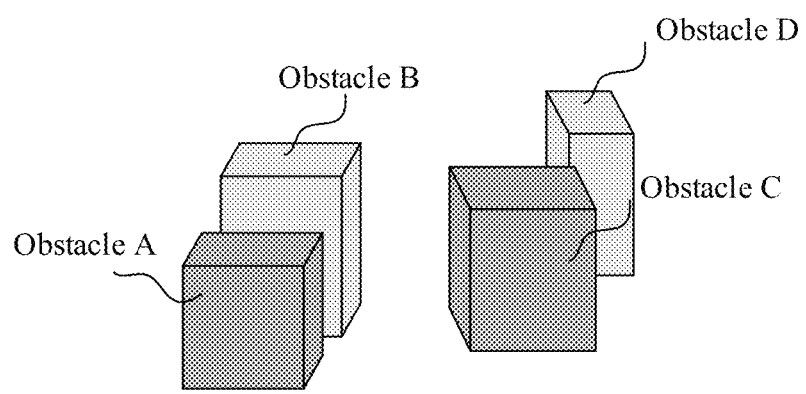
FIG. 4 is a schematic diagram of obstacles in a road scene image according to an example embodiment.

It may be understood that the relative depth-of-field relationship between two target obstacles is a smallest unit of the relative depth-of-field relationship between the target obstacles corresponding to the road scene image. For example, the target obstacles in the road scene image shown in FIG. 4 include an obstacle A, an obstacle B, an obstacle C, and an obstacle D. A relative depth-of-field relationship between the target obstacles corresponding to the road scene image may be denoted as "(obstacle A, obstacle B, −1), (obstacle B, obstacle C, 0), and (obstacle C, obstacle D, 1)", indicating that the obstacle A obscures the obstacle B, there is no occlusion relationship between the obstacle B and the obstacle C, and the obstacle C obscures the obstacle D.

S208: Acquire a ranging result of each obstacle collected by a ranging apparatus corresponding to the target vehicle.

The ranging apparatus is an apparatus for measuring a distance from each obstacle to the target vehicle in a real scene. The real scene is a scene corresponding to the acquired road scene image. The ranging apparatus corresponding to the target vehicle may be integrated or installed on the target vehicle.

The ranging apparatus may be at least one of a camera or a radar. The camera may be a monocular camera, a binocular camera, a depth camera, a 3-dimensional (3 Dimensions, 3D) camera, or the like. In some embodiments, the camera is invoked to enable a scan mode, so as to scan in real time a target object in a field of view of the camera, and generate, in real time according to a specified frame rate, ranging data for ranging. The ranging data may be an obstacle image. The obstacle image may be a monocular image, a binocular image, a depth image, a 3D image, or the like matching the ranging apparatus. The radar may be a radar system such as a lidar, a millimeter wave radar, or the like. The lidar is a radar system that detects feature data such as a position, a speed, an attitude, and a shape of a target object by emitting laser beams. The millimeter wave radar is a radar system that performs detection in a millimeter wave band. The radar system transmits a detection signal to the target object in real time, receives an echo signal reflected by the target object, and determines feature data of the target object based on a difference between the detection information and the echo signal. The radar system includes a plurality of transmitters and receivers, to obtain ranging data for ranging corresponding to the obstacles in the real scene. The ranging data may be 3D point cloud data.

In some embodiments, after collecting the ranging data by using the ranging apparatus, the target vehicle may determine an estimated distance from each obstacle to the target vehicle based on the obtained ranging data, that is, obtain a ranging result of each obstacle, and upload the ranging result to the computer device, so that the computer device acquires the ranging result of each obstacle collected by the capture apparatus corresponding to the target vehicle.

In some embodiments, after collecting the ranging data by using the ranging apparatus, the target vehicle uploads the ranging data to the computer device. After receiving the ranging data collected by the ranging apparatus, the computer device determines the estimated distance from each obstacle to the target vehicle based on the ranging data to obtain the ranging result of each obstacle.

Data types of the ranging data collected by different ranging apparatuses may be different. Correspondingly, the ranging result of each obstacle may be determined in different manners based on the ranging data. In some examples, a distance prediction model matching the ranging apparatus may be used to obtain the ranging result of each obstacle based on the ranging data. The distance prediction model is a neural network model, including a monocular single-frame ranging model, a monocular multi-frame ranging model, a binocular stereo vision ranging model, a radar target detection and ranging model, a radar-monocular image fusion ranging model, or other suitable model.

For example, when the ranging data is a single-frame monocular image captured by a monocular camera, a monocular single-frame ranging method may be used to estimate the distance from the obstacle in the single-frame monocular image to the target vehicle, to obtain the ranging result. When the ranging data is a multi-frame monocular image captured by a monocular camera, a monocular multi-frame ranging method may be used to estimate the distance from the obstacle in the multi-frame monocular image to the target vehicle, to obtain the ranging result. When the ranging data is a binocular image captured by the binocular camera, a binocular stereo vision ranging method may be used to estimate the distance from the obstacle in the binocular image to the target vehicle, to obtain the ranging result. When the ranging data is 3D point cloud data collected by a radar, a radar target detection and ranging algorithm is used to predict the distance from the target obstacle corresponding to the 3D point cloud data to the target vehicle based on the collected 3D point cloud data, to obtain the ranging result. When the ranging data includes a monocular image captured by the monocular camera and the 3D point cloud data collected by the radar, a radar-monocular image fused target detection and ranging algorithm is used to estimate the distance from the obstacle in the monocular image to the target vehicle based on the captured monocular image and the collected 3D point cloud data, to obtain the ranging result.

S210: Determine, according to the relative depth-of-field relationship between the target obstacles and the ranging result of each obstacle, an obstacle detection result corresponding to the road where the target vehicle is located.

The obstacle detection result may reflect the relative distance relationship between the obstacle corresponding to the road scene image and the target vehicle. The obstacle detection result is at least one of the relative depth-of-field relationship between the target obstacles, the ranging result of each obstacle, or a hazard level of each obstacle. The hazard level is a representation of a degree of hazard of the obstacle relative to the target vehicle. In practice, the target vehicle may avoid the target obstacle with a higher hazard level.

In some embodiments, S210 includes: determining the hazard level of each obstacle according to the ranging result of each obstacle and the relative depth-of-field relationship between the target obstacles in the obstacles, and determining at least one of the relative depth-of-field relationship between the target obstacles, the ranging result of each obstacle, or the hazard level of each obstacle as the obstacle detection result corresponding to the road where the target vehicle is located.

In some embodiments, the hazard level of the target obstacle in any two target obstacles in an occlusion relationship that is obscured is lower than the hazard level of the target obstacle in the foreground. That is to say, the target obstacle in the two target obstacles in an occlusion relationship that is closer to the target vehicle has a higher hazard level.

In some embodiments, the determining, by the computer device, a hazard level of each obstacle according to the ranging result of each obstacle and the relative depth-of-field relationship between the target obstacles in the obstacles includes: determining an original hazard level corresponding to each obstacle according to the ranging result of each obstacle; correcting the original hazard levels of the target obstacles based on the relative depth-of-field relationship between the target obstacles in the obstacles, so as to obtain corresponding corrected hazard levels; and determining, according to the unadjusted original hazard levels of the obstacles and the corrected hazard levels of the target obstacles, a hazard level corresponding to each obstacle on the road where the target vehicle is located. The original hazard level matches the ranging result. It may be understood that an obstacle closer to the target vehicle means a higher hazard level to the target vehicle, that is, a higher original hazard level.

The computer device determines distance intervals of the obstacles according to the ranging result of the obstacles from the target vehicle, acquires an original hazard level matching each distance interval, determines the original hazard levels as the original hazard levels of the obstacles, determines relative concern levels of the target obstacles based on the relative depth-of-field relationship between the target obstacles in the obstacles, corrects the original hazard levels of the target obstacles based on the relative concern levels to obtain corresponding corrected hazard levels, and determines the unadjusted original hazard levels of the obstacles and the corrected hazard levels of the target obstacles as the hazard levels respectively corresponding to the obstacles on the road where the target vehicle is located. The original hazard level matching the distance interval may be changed according to a changed travelling scene of the target vehicle. The travelling scene of the target vehicle includes a road scene and a weather scene. The road scene may be a common urban road, a bustling street, a highway, and the like, and the weather scene includes a sunny day, rainy and snowy days, a foggy day, and the like. The relative concern level of the target obstacle is concern levels of the target obstacles in an occlusion relationship relative to each other. For example, if the obstacle A obscures the obstacle B, the relative concern level of the obstacle A is a high concern level, and the relative concern level of the obstacle B is a low concern level. A manner of correcting the original hazard levels of the target obstacles based on the relative concern levels may be as follows: When the original hazard level matches the relative concern level, the original hazard level is determined as the corrected hazard level, and the original hazard level does not match the relative concern level, the original hazard level is corrected to a hazard level matching the relative concern level, and the hazard level matching the relative concern level is the corrected hazard level.

An example is used to describe the above embodiments. For example, when the target vehicle is travelling on a common urban road on a sunny day, assuming that a vehicle speed is 40 km/h in this scenario, an original hazard level of a detected obstacle at a distance less than 10 m from the target vehicle is determined as the high original hazard level (denoted as high), and an original hazard level of a detected obstacle at a distance greater than or equal to 10 m and less than 30 m from the target vehicle is determined as a medium original hazard level (denoted as medium), and an original hazard level of a detected obstacle at a distance greater than or equal to 30 m from the target vehicle is determined as a low original hazard level (denoted as low). The distances between the detected obstacles A and B to the target vehicle are both less than 10 m, the obstacles A and B are in an occlusion relationship, and a corresponding relative depth-of-field relationship is "(obstacle A, obstacle B, −1)". Therefore, it is determined that the original hazard levels of the obstacle A and the obstacle B are both the high original hazard level (denoted as high), and it is determined that the relative concern level of the obstacle A is the high concern level (denoted as high) and the relative concern level of the obstacle B is the low concern level (denoted as low). During correction of the original hazard levels of the obstacle A and the obstacle B based on the relative concern levels of the obstacle A and the obstacle B respectively, the high original hazard level of the obstacle A is not changed, the original hazard level of the obstacle B is corrected from the high original hazard level to the low hazard level, and the original hazard levels of the detected obstacles other than the obstacle A and the obstacle B and the corrected hazard levels of the obstacle A and the obstacle B are determined as the hazard levels respectively corresponding to the obstacles on the road where the target vehicle is located.

In the above obstacle detection method, the computer device performs obstacle recognition on the acquired road scene image to obtain the region information and the depth-of-field information corresponding to each obstacle in the road scene image of the road where the target vehicle is located, determines the target obstacles in an occlusion relationship according to the region information corresponding to each obstacle, and determines the relative depth-of-field relationship between the target obstacles according to the depth-of-field information of the target obstacles. Therefore, after the ranging result of each obstacle collected by the ranging apparatus corresponding to the target vehicle is obtained, even when two or more target obstacles are stuck or obscured, the obstacle detection result corresponding to the road where the target vehicle is located can still be accurately determined according to the relative depth-of-field relationship between the target obstacles and the ranging result of each obstacle, so that the obstacle with a relatively high hazard level can be avoided in time based on the accurate the obstacle detection result, thereby improving safety and reliability of automated driving.

This application further provides an application scenario where the above obstacle detection method is applied. The application of the obstacle detection method in this application scenario may be as follows:

After acquiring the road scene image of the road where the target vehicle is located, the computer device performs obstacle recognition on the road scene image by using the obstacle recognition model to obtain the region information and the depth-of-field information corresponding to each obstacle in the road scene image, and determines the relative depth-of-field relationship between the target obstacles in the obstacles in an occlusion relationship according to the region information corresponding to each obstacle. The computer device further receives the 3D point cloud data collected by the target vehicle through the radar, projects the 3D point cloud data to an image coordinate system to obtain a point cloud image, obtains the ranging result of each obstacle based on the point cloud image, that is, obtains the distance from each obstacle to the target vehicle, determines the original hazard level (including low, medium, and high) corresponding to each obstacle according to the distance, corrects the original hazard levels of the target obstacles in the obstacles according to the relative depth-of-field relationship between the target obstacles, to obtain the corrected hazard level of each target obstacle, determines the uncorrected original hazard levels of the obstacles and the corrected hazard levels of the target obstacle as the hazard levels of the target obstacles, and then outputs the ranging result of each obstacle, the relative depth-of-field relationship of the target obstacles, and the hazard level of each obstacle as the obstacle detection result, that is, outputs a 3D physical distance, the depth-of-field relationship, and the hazard level of the obstacle.

Figure 5:
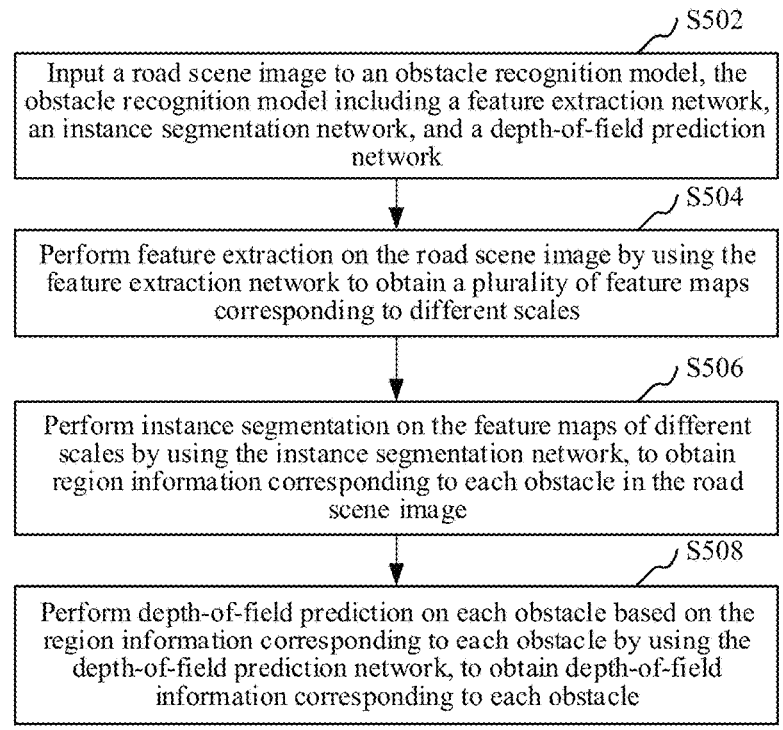
FIG. 5 is a schematic flowchart of obstacle recognition steps according to an example embodiment.

In some embodiments, as shown in FIG. 5, S204 includes the following steps.

S502: Input the road scene image to an obstacle recognition model, the obstacle recognition model including a feature extraction network, an instance segmentation network, and a depth-of-field prediction network.

The obstacle recognition model is a neural network model, which may include a convolutional neural network structure. The convolutional neural network may perform operations such as convolution calculation, normalization, and activation function calculation.

S504: Perform feature extraction on the road scene image by using the feature extraction network to obtain a plurality of feature maps corresponding to different scales.

The feature extraction network is configured to perform feature extraction on the road scene image. The feature extraction network may include a feature extraction backbone network (Backbone) and a feature pyramid network (FPN).

In some embodiments, the computer device inputs the road scene image to the feature extraction backbone network for processing by convolutional network layers of different scales in the feature extraction backbone network, to obtain a plurality of backbone feature maps corresponding to different scales; and inputs the backbone feature maps of different scales to the FPN for processing by the FPN, to obtain a plurality of feature maps corresponding to different scales. The FPN includes a plurality of upsampling modules. Each upsampling module is composed of an upsampling network layer, a normalization layer, and an activation layer. A number of upsampling modules is the same as a number of backbone feature maps of different scales extracted by the feature extraction backbone network.

The convolutional network layers of different scales mean image sizes of the feature maps outputted by the convolutional network layers may be different. After obtaining the plurality of backbone feature maps corresponding to different scales, the computer device inputs the plurality of backbone feature maps of different scales to the FPN, performs upsampling on each inputted backbone feature map by using the upsampling module of the FPN to amplify the backbone feature map, to obtain an amplified backbone feature map, and fuses the amplified backbone feature map with the inputted backbone feature map and a target backbone feature map to obtain a fused feature map of a corresponding scale, the target backbone feature map being a backbone feature map with a same scale as the amplified backbone feature map, thereby obtaining the plurality of feature maps corresponding to different scales.

S506: Perform instance segmentation on the feature maps of different scales by using the instance segmentation network, to obtain the region information corresponding to each obstacle in the road scene image.

The instance segmentation network is configured to perform instance segmentation on the obstacles in the road scene image, and may include a region proposal network (RPN), a target classification network, and a target segmentation network.

In some embodiments, the computer device inputs the feature maps of different scales to the RPN for processing by a convolutional network layer of a preset scale in the RPN, to obtain candidate regions corresponding to the feature maps; predicts an obstacle class corresponding to each of the candidate regions by using the target classification network; and performs instance segmentation on the candidate regions based on the predicted obstacle classes to which the candidate regions belong, to obtain region information corresponding to each obstacle.

The preset scale may include a plurality of different sizes, for example, the preset scale includes 3×3 and 1×1. After processing by the convolutional network layer of the preset scale in the RPN, a plurality of candidate boxes can be generated. A region included in each candidate box is the candidate region, so that the candidate region corresponding to each feature map is obtained. Then the feature map parts corresponding to the candidate regions are inputted to the target classification network by using a regional feature aggregation module (ROI Align), so as to classify the obstacles corresponding to the candidate regions by using the target classification network, to obtain the obstacle class corresponding to each candidate region, and the candidate region belonging to the obstacle class is inputted to the target segmentation network, to obtain the region information of the obstacle from the candidate region by using the target segmentation network.

S508: Perform depth-of-field prediction on each obstacle based on the region information corresponding to each obstacle by using the depth-of-field prediction network, to obtain the depth-of-field information corresponding to each obstacle.

The depth-of-field prediction network is configured to predict the depth-of-field information of each obstacle in the road scene image. In other embodiments of this application, the depth-of-field prediction network may be further configured to determine target obstacles in an occlusion relationship according to the region information corresponding to each obstacle, and determine relative depth-of-field information of the target obstacles according to the depth-of-field information of the target obstacles.

The computer device predicts depth information of each pixel in the road scene image by using the depth-of-field prediction network, and may predict the depth-of-field information corresponding to each obstacle based on the depth information of each pixel and the region information corresponding to each obstacle determined through the instance segmentation.

Figure 6:
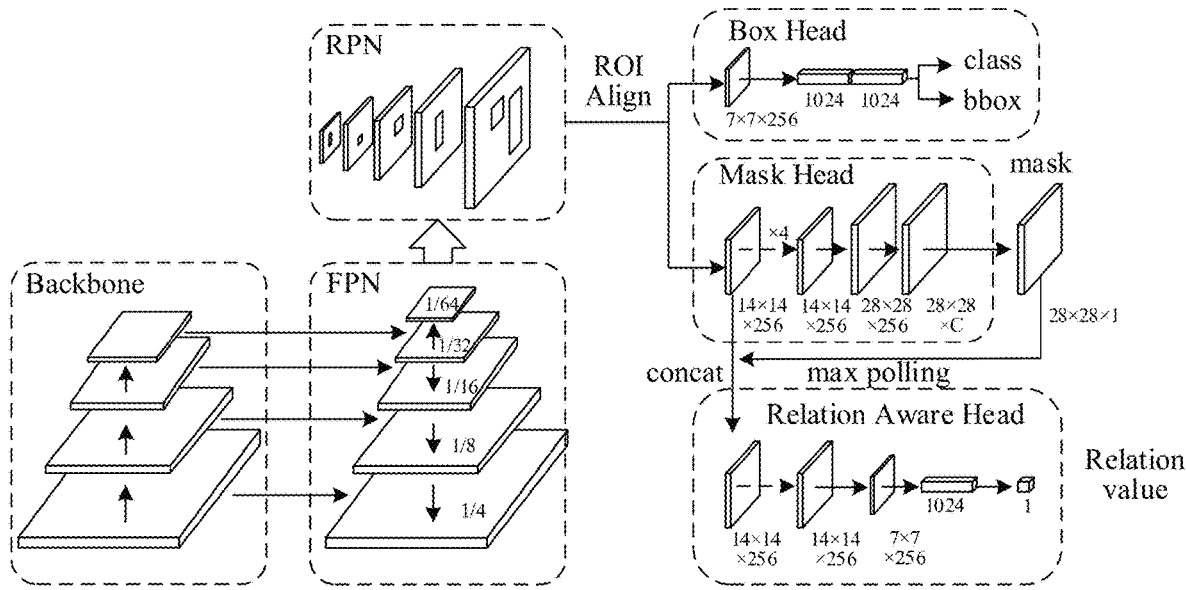
FIG. 6 is a schematic structural diagram of an obstacle recognition model according to an example embodiment.

FIG. 6 is a schematic structural diagram of an obstacle recognition model according to some embodiments. It may be seen that the obstacle recognition model includes a feature extraction network, an instance segmentation network, and a depth-of-field prediction network (Relation Aware Head).

The feature extraction network includes a feature extraction backbone network (Backbone) and an FPN. The instance segmentation network includes an RPN, a target classification network (Box head) and a target segmentation network (Mask head). The feature extraction backbone network (Backbone) includes convolution modules of different scales. Each convolution module includes a convolutional (Convolution) network layer a normalization layer (batch normalization, BN) and an activation layer (Relu). The FPN includes a plurality of upsampling modules. Each upsampling module is composed of an upsampling network layer (bilinear upsampling), a normalization layer, and an activation layer. A number of upsampling modules is the same as a number of backbone feature maps of different scales extracted by the feature extraction backbone network.

The term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The instance segmentation network includes an RPN, a target classification network (Box head) and a target segmentation network (Mask head). The RPN includes a plurality of convolution modules of a preset scale configured to extract candidate regions from the feature maps of different scales. The target classification network (Box head) includes a convolution module and a fully connected module, and is configured to predict a class of each candidate region and a candidate box position corresponding to each candidate region. The target segmentation network (Mask head) includes a plurality of convolution modules configured to perform non-linear transform on the candidate region to achieve instance segmentation of the obstacle.

The depth-of-field prediction network (Relation Aware Head) includes convolution modules of different scales and a downsampling module, and is configured to predict the depth-of-field information of the obstacle corresponding to each candidate region, and determine the relative depth-of-field relationship between the target obstacles in an occlusion relationship.

For example, still referring to FIG. 6, it is assumed that the feature extraction backbone network includes four convolution modules of different scales. An RGB image of W*H*C (W represents a length of the image, H represents a width of the image, and C represents a number of channels of the image) is inputted to the feature extraction backbone network. An image area of an image outputted by each convolution module is ¼ of an image area of the inputted image, so that four backbone feature maps of different scales are obtained. The obtained four feature maps of different scales are inputted to the FPN. The upsampling module of the FPN performs upsampling processing on one of the four backbone feature maps of different scales that has a smallest scale to amplify the backbone feature map, to obtain an amplified backbone feature map, which is shown by the following formula:

$$W_{out} \times H_{out} = (2 \times W_{in}) \times (2 \times H_{in})$$

$W_{out}$ is a length of the outputted image, $H_{out}$ is a width of the outputted image, $W_{in}$ is a length of the inputted image, and $H_{is}$ a width of the inputted image. After obtaining the amplified backbone feature map, the FPN fuses the amplified backbone feature map with the inputted image and a target backbone feature map to obtain four fused feature maps of different scales. The downsampling module of the FPN performs downsampling on the one of the four backbone feature maps of different scales that has a smallest scale to obtain a feature map of a new scale, thereby obtaining five feature maps of different scales by using the FPN.

The RPN extracts candidate regions from the five feature maps of different scales and inputs the feature map parts corresponding to the candidate regions to the target classification network (Box head) by using the regional feature aggregation module (ROI align), outputs a to-be-detected-obstacle class if the candidate regions belong to the obstacle class, returns to a candidate box position (boundbox), and inputs the candidate regions to the target segmentation network (Mask head). The target segmentation network (Mask head) classifies the candidate regions into two classes: foreground and background, the foreground being an obstacle region, so as to extract the region information (Mask) of the obstacle, and uses the obstacle class outputted by the target classification network (Box head) as the obstacle class corresponding to the region information.

A feature fusion module (concat) and a maximum pooling module (max polling) input a result of instance segmentation (that is, silent information of the obstacles and the obstacle class) to the depth-of-field prediction network (Relation Aware Head). The depth-of-field prediction network (Relation Aware Head) performs depth-of-field prediction on each obstacle based on the region information corresponding to each obstacle, and outputs a depth-of-field value corresponding to each obstacle.

In the above embodiments, the computer device inputs the road scene image to the obstacle recognition model, the obstacle recognition model including the feature extraction network, the instance segmentation network, and the depth-of-field prediction network, performs feature extraction on the road scene image by using the feature extraction network to obtain the plurality of feature maps corresponding to different scales, and performs instance segmentation on the feature maps of different scales by using the instance segmentation network, to obtain the region information corresponding to each obstacle in the road scene image. Therefore, the region information can be accurately extracted for the obstacles of different scales in the road scene image, and depth-of-field prediction can be performed on each obstacle based on the region information corresponding to each obstacle by using the depth-of-field prediction network, so as to obtain the depth-of-field information corresponding to each obstacle. In this way, accurate acquisition of the region information and the depth information of the obstacles of different scales in road scene images is realized, thereby improving accuracy of obstacle detection.

In some embodiments, the step in which the computer device determines the target obstacles in an occlusion relationship according to the region information corresponding to each obstacle includes: acquiring a candidate region corresponding to each obstacle based on the region information corresponding to each obstacle during the obstacle recognition; calculating an overlapping ratio between the candidate regions corresponding to different obstacles; and determining, as the target obstacles in an occlusion relationship, the obstacles corresponding to the candidate regions with an overlapping ratio greater than an overlapping ratio threshold.

During the obstacle recognition, the computer device obtains the candidate box corresponding to the candidate region when extracting the candidate region by using the RPN in the instance segmentation network and obtains a size and coordinates of the candidate box. The computer device may determine the candidate region corresponding to each obstacle according to the region information corresponding to each obstacle and determine a candidate box corresponding to each obstacle, calculate an overlapping ratio between the candidate boxes corresponding to different obstacles based on sizes and coordinates of the candidate boxes, and determine, as the target obstacles in an occlusion relationship, the obstacles corresponding to the candidate regions with an overlapping ratio greater than an overlapping ratio threshold. The overlapping ratio threshold may be set according to an actual application scenario.

In the above embodiments, the computer device acquires the candidate region corresponding to each obstacle based on the region information corresponding to each obstacle during the obstacle recognition, and calculates the overlapping ratio between the candidate regions corresponding to different obstacles, so that the target obstacles in an occlusion relationship can be determined based on the overlapping ratio between the candidate regions corresponding to the obstacles, and determination of the relative depth-of-field relationship between the target obstacles can be realized, thereby improving the accuracy of obstacle detection.

In some embodiments, the step in which the computer device determines the relative depth-of-field relationship between the target obstacles according to the depth-of-field information of the target obstacles includes: sorting the target obstacles by distance based on the depth-of-field information of the target obstacles, to obtain a corresponding depth-of-field sorting result; and determining the relative depth-of-field relationship between the target obstacles based on the depth-of-field sorting result.

The depth-of-field information of each obstacle obtained by the computer device may be a depth-of-field value. A magnitude of the depth-of-field value indicates a distance from the obstacle to the target vehicle. For example, a smaller depth-of-field value indicates a shorter distance from the obstacle to the target vehicle, and a larger depth-of-field value indicates a longer distance from the obstacle to the target vehicle. The computer device sorts the target obstacles based on the depth-of-field information of the target obstacles. In some embodiments, the computer device sorts the target obstacles according to the magnitudes of the depth-of-field values, to obtain the depth-of-field sorting result of the target obstacles. After determining the relative depth-of-field relationship between the target obstacles based on the depth-of-field sorting result, the computer device may express the relative depth-of-field relationship between any two target obstacles by a preset character. For example, "−1", "0", or "1" is used to indicate the relative depth-of-field relationship between the target obstacles.

In the above embodiments, the computer device sorts the target obstacles based on the depth-of-field information of the target obstacles, to obtain the corresponding depth-of-field sorting result, and determines the relative depth-of-field relationship between the target obstacles based on the depth-of-field sorting result, and therefore accurately determines the obstacle detection result corresponding to the road where the target vehicle is located, thereby improving the accuracy of obstacle detection.

In some embodiments, the computer device acquires the ranging result of each obstacle collected by the ranging apparatus corresponding to the target vehicle includes: acquiring ranging data collected by the ranging apparatus corresponding to the target vehicle; preprocessing the ranging data in a data preprocessing manner matching the ranging apparatus, to obtain preprocessed ranging data; and performing distance estimation on the preprocessed ranging data by using a distance prediction model matching the ranging apparatus, to obtain the ranging result of each obstacle. The ranging apparatus includes at least one of a camera or a radar.

Data types of the ranging data collected by the ranging apparatus may be different. Correspondingly, the ranging result of each obstacle may be determined in different manners based on the ranging data. In some embodiments, a distance prediction model matching the ranging apparatus may be used to obtain the ranging result of each obstacle based on the ranging data. Before the ranging result is acquired by using the distance prediction model, the ranging data may be preprocessed in a data preprocessing manner consistent with or matching the distance prediction model. The data preprocessing manner matching the distance prediction model means the data preprocessing manner matches that of the ranging apparatus. The data preprocessing manner includes an image preprocessing manner or a point cloud data preprocessing manner. The image preprocessing manner may be at least one of image graying, geometric transformation, or image augmentation, and the point cloud data preprocessing may mean projecting point cloud data to a coordinate system to obtain a point cloud image.

For example, when the ranging data is a monocular or binocular image captured by a camera, the captured monocular or binocular image may be preprocessed in the image preprocessing manner to obtain a preprocessed monocular or binocular image. When the collected image data is 3D point cloud data, the 3D point cloud data may be preprocessed in the point cloud data preprocessing manner to obtain a point cloud image.

In the above embodiments, the computer device acquires the ranging data collected by the ranging apparatus corresponding to the target vehicle, preprocesses the ranging data in the data preprocessing manner matching the ranging apparatus to obtain the preprocessed ranging data, and performs distance estimation on the preprocessed ranging data by using the distance prediction model matching the ranging apparatus, to obtain the ranging result of each obstacle, thereby improving the accuracy of obstacle detection.

Figure 7:
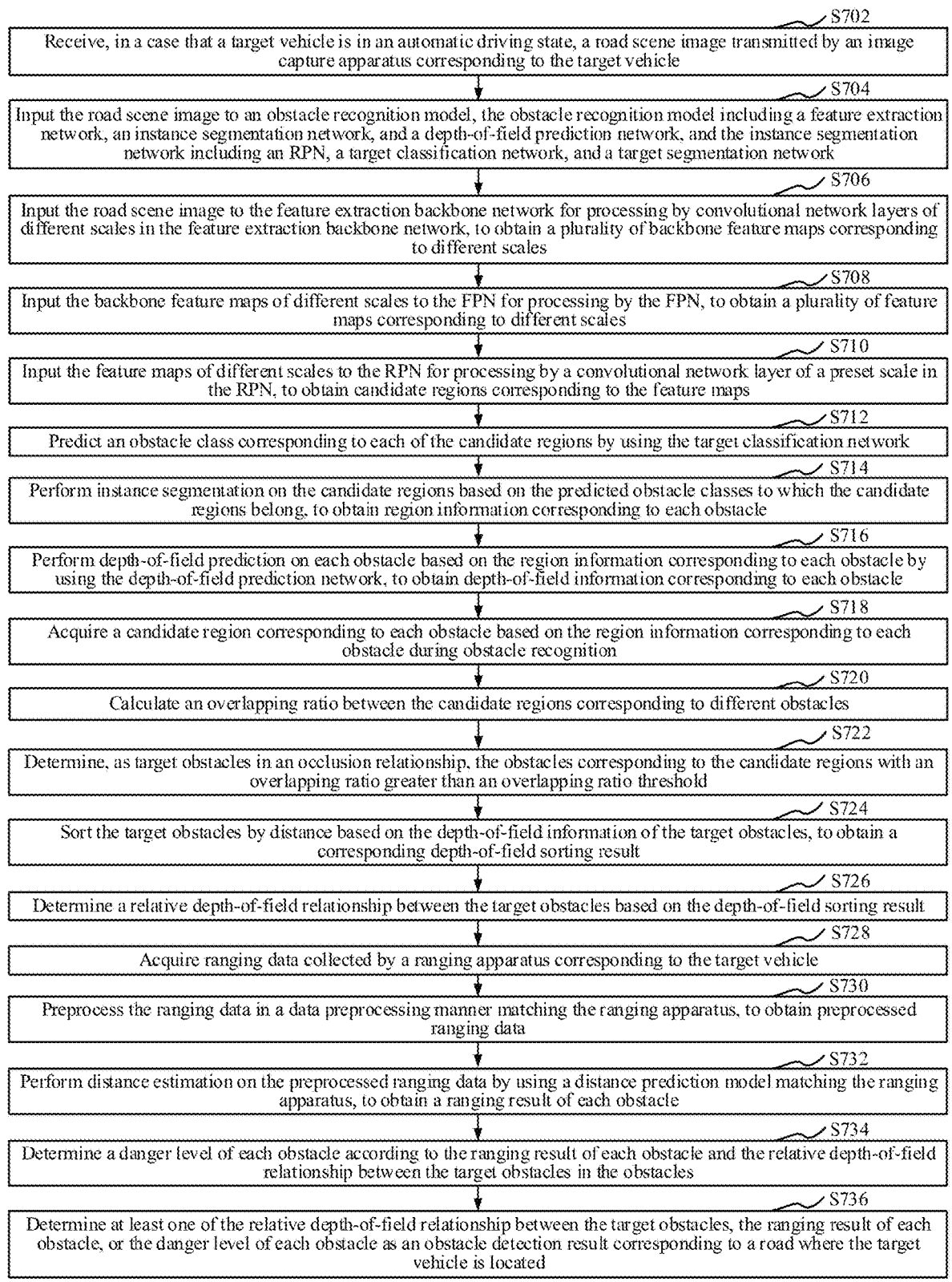
FIG. 7 is a schematic flowchart of an obstacle detection method according to an example embodiment.

In some embodiments, as shown in FIG. 7, an obstacle detection method is further provided. The method is applied to the computer device 104 in FIG. 1, for example. The method includes the following steps:

S702: Receive, when a target vehicle is in an automated driving state, a road scene image transmitted by an image capture apparatus corresponding to the target vehicle.

S704: Input the road scene image to an obstacle recognition model, the obstacle recognition model including a feature extraction network, an instance segmentation network, and a depth-of-field prediction network; the feature extraction network including a feature extraction backbone network and an FPN; and the instance segmentation network including an RPN, a target classification network, and a target segmentation network.

S706: Input the road scene image to the feature extraction backbone network for processing by convolutional network layers of different scales in the feature extraction backbone network, to obtain a plurality of backbone feature maps corresponding to different scales.

S708: Input the backbone feature maps of different scales to the FPN for processing by the FPN, to obtain a plurality of feature maps corresponding to different scales.

S710: Input the feature maps of different scales to the RPN for processing by a convolutional network layer of a preset scale in the RPN, to obtain candidate regions corresponding to the feature maps.

S712: Predict an obstacle class corresponding to each of the candidate regions by using the target classification network.

S714: Perform instance segmentation on the candidate regions based on the predicted obstacle classes to which the candidate regions belong, to obtain region information corresponding to each obstacle.

S716: Perform depth-of-field prediction on each obstacle based on the region information corresponding to each obstacle by using the depth-of-field prediction network, to obtain the depth-of-field information corresponding to each obstacle.

S718: Acquire a candidate region corresponding to each obstacle based on the region information corresponding to each obstacle during the obstacle recognition.

S720: Calculate an overlapping ratio between the candidate regions corresponding to different obstacles.

S722: Determine, as target obstacles in an occlusion relationship, the obstacles corresponding to the candidate regions with an overlapping ratio greater than an overlapping ratio threshold.

S724: Sort the target obstacles by distance based on the depth-of-field information of the target obstacles, to obtain a corresponding depth-of-field sorting result.

S726: Determine a relative depth-of-field relationship between the target obstacles based on the depth-of-field sorting result.

S728: Acquire ranging data collected by a ranging apparatus corresponding to the target vehicle.

S730: Preprocess the ranging data in a data preprocessing manner matching the ranging apparatus, to obtain preprocessed ranging data.

S732: Perform distance estimation on the preprocessed ranging data by using a distance prediction model matching the ranging apparatus, to obtain a ranging result of each obstacle.

S734: Determine a hazard level of each obstacle according to the ranging result of each obstacle and the relative depth-of-field relationship between the target obstacles in the obstacles.

S736: Determine at least one of the relative depth-of-field relationship between the target obstacles, the ranging result of each obstacle, or the hazard level of each obstacle as an obstacle detection result corresponding to a road where the target vehicle is located.

This disclosure further provides an application scenario where the above obstacle detection method is applied. The application of the obstacle detection method may be as follows:

During travelling of the target vehicle in the automated driving state, the road scene image (which is a monocular image) of the road where the target vehicle is located is captured by using a monocular camera, and the road scene image is transmitted to a computer device. The road scene image can reflect a surrounding environment of the target vehicle, such as lanes and obstacles, including vehicles, pedestrians, street lights, traffic signs, and the like. In addition, 3D point cloud data of each obstacle on the road where the target vehicle is located is collected by using a radar, and the 3D point cloud data is transmitted to the computer device.

After acquiring the road scene image of the target vehicle, the computer device inputs the road scene image to the obstacle recognition model. The obstacle recognition model includes a feature extraction network, an instance segmentation network and a depth-of-field prediction network (Relation Aware Head). The feature extraction network includes a feature extraction backbone network (Backbone) and an FPN. The instance segmentation network includes an RPN, a target classification network (Box head) and a target segmentation network (Mask head). After processing by convolutional network layers of different scales in the feature extraction backbone network, the plurality of backbone feature maps corresponding to different scales are obtained, and the backbone feature maps of different scales are inputted to the FPN for processing by the upsampling module and the downsampling module in the FPN, to obtain the plurality of feature maps corresponding to different scales, and the feature maps of different scales are inputted to the RPN for processing by the convolutional network layer of the preset scale in the RPN, to obtain the candidate region corresponding to each feature map, and the obstacle class corresponding to each candidate region is predicted by using the target classification network. Instance segmentation is performed on the candidate region based on the predicted obstacle class to which each candidate region belongs, to obtain the region information (mask) corresponding to each obstacle. Depth-of-field prediction is performed on each obstacle based on the region information corresponding to each obstacle by using the depth-of-field prediction network, to obtain the depth-of-field information corresponding to each obstacle, and a candidate region (a candidate box) corresponding to each obstacle is acquired based on the region information (mask) corresponding to each obstacle by using the depth-of-field prediction network during the obstacle recognition. The target obstacles in an occlusion relationship are determined based on the candidate regions, and depths of field of the target obstacles are sorted according to the predicted depth-of-field information of each obstacle, to obtain a depth-of-field sorting relationship between the target obstacles (that is, the relative depth-of-field relationship).

After acquiring the 3D point cloud data of the obstacles on the road where the target vehicle is located, the computer device projects the 3D point cloud data to an image coordinate system to obtain a point cloud image, determines a distance from each obstacle to the target vehicle based on the point cloud image, and determines the original hazard level of each obstacle based on the distance from the target vehicle. After obtaining the depth-of-field sorting relationship between the target obstacles in the road scene image, the computer device corrects the original hazard levels of the target obstacles in the obstacles based on the depth-of-field sorting relationship, to obtain the corrected hazard levels of the target obstacles, and determines the uncorrected original hazard levels of the obstacles and the corrected hazard levels of the target obstacle as the hazard levels of the target obstacles. If the target obstacle is obscured by other obstacles, it is determined that the corrected hazard level of the target obstacle is low. If the original hazard level of the target obstacle does not match the depth-of-field sorting result, the original hazard level of the obstacle is corrected based on the depth-of-field sorting result.

After obtaining the hazard level of each obstacle, the computer device outputs the distance from each obstacle to the target vehicle, the depth-of-field sorting relationship between the obstacles, and the concern level of each obstacle as the obstacle detection result.

It is to be understood that, although the steps in the FIG. 2, FIG. 5, and FIG. 7 are shown in a certain order as indicated by the arrows, the steps are not required to be performed in that order. Unless clearly specified in this specification, there is no required sequence for the execution of the steps, and the steps may be performed in another order. In addition, at least some steps in FIG. 2, FIG. 5, and FIG. 7 may include a plurality of steps or a plurality of stages. The steps or the stages may be performed concurrently, overlapping in part, or separately. The steps or the stages are not necessarily performed in sequence, and may be performed in turn or alternately with another step or at least some of steps or stages of the another step.

Figure 8:
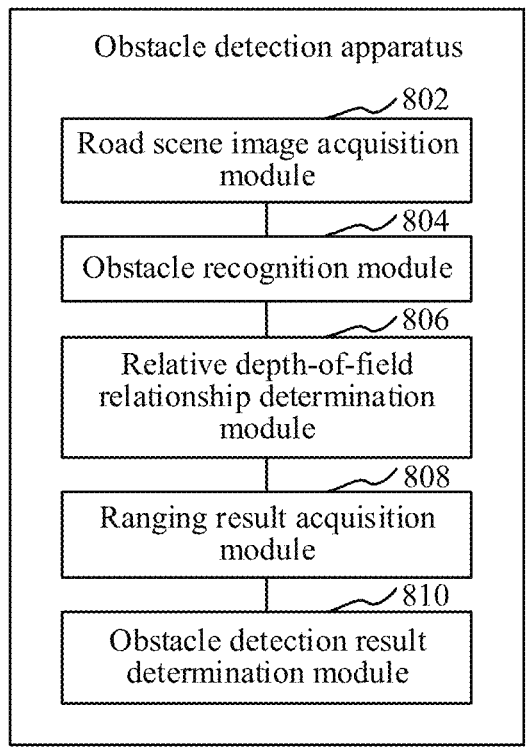
FIG. 8 is a structural block diagram of an obstacle detection apparatus according to an example embodiment.

In some embodiments, as shown in FIG. 8, an obstacle detection apparatus is provided, which may be a software module, a hardware module, or a combination thereof to be incorporated as a part of a computer device. The apparatus includes: a road scene image acquisition module 802, an obstacle recognition module 804, a relative depth-of-field relationship determination module 806, a ranging result acquisition module 808, and an obstacle detection result determination module 810.

The road scene image acquisition module 802 is configured to acquire a road scene image of a road where a target vehicle is located.

The obstacle recognition module 804 is configured to perform obstacle recognition on the road scene image to obtain region information and depth-of-field information corresponding to each obstacle in the road scene image.

The relative depth-of-field relationship determination module 806 is configured to: determine target obstacles in an occlusion relationship according to the region information corresponding to each obstacle, and determine a relative depth-of-field relationship between the target obstacles according to the depth-of-field information of the target obstacles.

The ranging result acquisition module 808 is configured to acquire a ranging result of each obstacle collected by a ranging apparatus corresponding to target vehicle.

The obstacle detection result determination module 810 is configured to determine, according to the relative depth-of-field relationship between the target obstacles and the ranging result of each obstacle, an obstacle detection result corresponding to the road where the target vehicle is located.

In some embodiments, the road scene image acquisition module 802 is further configured to receive, when the target vehicle is in an automated driving state, a road scene image transmitted by an image capture apparatus corresponding to the target vehicle, the road scene image being an image of a real scene of the road where the target vehicle is located captured by the image capture apparatus.

In some embodiments, the obstacle detection result determination module 810 is further configured to: determine a hazard level of each obstacle according to the ranging result of each obstacle and the relative depth-of-field relationship between the target obstacles in the obstacles; and determine at least one of the relative depth-of-field relationship between the target obstacles, the ranging result of each obstacle, or the hazard level of each obstacle as the obstacle detection result corresponding to the road where the target vehicle is located.

In some embodiments, the obstacle detection result determination module 810 is further configured to: determine an original hazard level corresponding to each obstacle according to the ranging result of each obstacle; correct the original hazard levels of the target obstacles based on the relative depth-of-field relationship between the target obstacles in the obstacles, so as to obtain corresponding corrected hazard levels; and determine, according to the unadjusted original hazard levels of the obstacles and the corrected hazard levels of the target obstacles, a hazard level corresponding to each obstacle on the road where the target vehicle is located.

In the above embodiments, obstacle recognition is performed on the acquired road scene image to obtain the region information and the depth-of-field information corresponding to each obstacle in the road scene image of the road where the target vehicle is located, the target obstacles in an occlusion relationship are determined according to the region information corresponding to each obstacle, and the relative depth-of-field relationship between the target obstacles is determined according to the depth-of-field information of the target obstacles. Therefore, after the ranging result of each obstacle collected by the ranging apparatus corresponding to the target vehicle is obtained, even when two or more target obstacles are stuck or obscured, the obstacle detection result corresponding to the road where the target vehicle is located can still be accurately determined according to the relative depth-of-field relationship between the target obstacles and the ranging result of each obstacle, so that the obstacle with a relatively high hazard level can be avoided in time based on the accurate the obstacle detection result, thereby improving safety and reliability of automated driving.

In some embodiments, the obstacle recognition module 804 is further configured to: input the road scene image to an obstacle recognition model, the obstacle recognition model including a feature extraction network, an instance segmentation network, and a depth-of-field prediction network; perform feature extraction on the road scene image by using the feature extraction network to obtain a plurality of feature maps corresponding to different scales; perform instance segmentation on the feature maps of different scales by using the instance segmentation network, to obtain the region information corresponding to each obstacle in the road scene image; and perform depth-of-field prediction on each obstacle based on the region information corresponding to each obstacle by using the depth-of-field prediction network, to obtain the depth-of-field information corresponding to each obstacle.

In some embodiments, the feature extraction network includes a feature extraction backbone network and an FPN, and the obstacle recognition module 804 is further configured to: input the road scene image to the feature extraction backbone network for processing by convolutional network layers of different scales in the feature extraction backbone network, to obtain a plurality of backbone feature maps corresponding to different scales; input the backbone feature maps of different scales to the FPN for processing by the FPN, to obtain a plurality of feature maps corresponding to different scales after.

In some embodiments, the instance segmentation network includes an RPN, a target classification network, and a target segmentation network, and the obstacle recognition module 804 is further configured to: input the feature maps of different scales to the RPN for processing by a convolutional network layer of a preset scale in the RPN, to obtain candidate regions corresponding to the feature maps; predict an obstacle class corresponding to each of the candidate regions by using the target classification network; and perform instance segmentation on the candidate regions based on the predicted obstacle classes to which the candidate regions belong, to obtain region information corresponding to each obstacle.

In the above embodiments, the road scene image is inputted to the obstacle recognition model, the obstacle recognition model including the feature extraction network, the instance segmentation network, and the depth-of-field prediction network, feature extraction is performed on the road scene image by using the feature extraction network to obtain the plurality of feature maps corresponding to different scales, and instance segmentation is performed on the feature maps of different scales by using the instance segmentation network, to obtain the region information corresponding to each obstacle in the road scene image. Therefore, the region information can be accurately extracted for the obstacles of different scales in the road scene image, and depth-of-field prediction can be performed on each obstacle based on the region information corresponding to each obstacle by using the depth-of-field prediction network, so as to obtain the depth-of-field information corresponding to each obstacle. In this way, accurate acquisition of the region information and the depth information of the obstacles of different scales in road scene images is realized, thereby improving accuracy of obstacle detection.

In some embodiments, the relative depth-of-field relationship determination module 806 is further configured to: acquire a candidate region corresponding to each obstacle based on the region information corresponding to each obstacle during the obstacle recognition; calculate an overlapping ratio between the candidate regions corresponding to different obstacles; and determine, as target obstacles in an occlusion relationship, the obstacles corresponding to the candidate regions with an overlapping ratio greater than an overlapping ratio threshold.

In the above embodiments, the candidate region corresponding to each obstacle is acquired based on the region information corresponding to each obstacle during the obstacle recognition, and the overlapping ratio between the candidate regions corresponding to different obstacles is calculated, so that the target obstacles in an occlusion relationship can be determined based on the overlapping ratio between the candidate regions corresponding to the obstacles, and determination of the relative depth-of-field relationship between the target obstacles can be realized, thereby improving the accuracy of obstacle detection.

In some embodiments, the relative depth-of-field relationship determination module 806 is further configured to: sort the target obstacles by distance based on the depth-of-field information of the target obstacles, to obtain a corresponding depth-of-field sorting result; and determine the relative depth-of-field relationship between the target obstacles based on the depth-of-field sorting result.

In the above embodiments, the target obstacles are sorted based on the depth-of-field information of the target obstacles, to obtain the corresponding depth-of-field sorting result, and the relative depth-of-field relationship between the target obstacles is determined based on the depth-of-field sorting result, and therefore the obstacle detection result corresponding to the road where the target vehicle is located is accurately determined, thereby improving the accuracy of obstacle detection.

In some embodiments, the ranging apparatus includes at least one of a camera or a radar, and the ranging result acquisition module 808 is further configured to: acquire ranging data collected by the ranging apparatus corresponding to the target vehicle; preprocess the ranging data in a data preprocessing manner matching the ranging apparatus, to obtain preprocessed ranging data; and perform distance estimation on the preprocessed ranging data by using a distance prediction model matching the ranging apparatus, to obtain the ranging result of each obstacle.

In some embodiments, the ranging data collected by the ranging apparatus corresponding to the target vehicle is acquired, the ranging data in the data preprocessing manner matching the ranging apparatus is preprocessed to obtain the preprocessed ranging data, and distance estimation is performed on the preprocessed ranging data by using the distance prediction model matching the ranging apparatus, to obtain the ranging result of each obstacle, thereby improving the accuracy of obstacle detection.

For an example of the obstacle detection apparatus, reference may be made to the obstacle detection method described above. The modules in the foregoing obstacle detection apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a server, and an internal structure diagram thereof may be shown in FIG. 9. The computer device includes a processor, a memory, and a network interface connected through a system bus. The processor of the computer device is configured to provide computing and control capabilities. The memory of the computer device includes a non-volatile non-transitory storage medium and an internal memory. The non-volatile non-transitory storage medium stores an operating system, a computer program, and a database. The internal memory provides an environment for running of the operating system and the computer programs in the non-volatile non-transitory storage medium. The database of the computer device is configured to store data of a road scene image. The network interface of the computer device is configured to communicate with an external terminal through a network connection. The computer program is executed by the processor to implement an obstacle detection method.

In some embodiments, a computer device is provided. The computer device may be a terminal, and an internal structure diagram thereof may be shown in FIG. 10. The computer device includes a processor, a memory, a communication interface, a display screen, and an input apparatus that are connected by using a system bus. The processor of the computer device is configured to provide computing and control capabilities. The memory of the computer device includes a non-volatile non-transitory storage medium and an internal memory. The non-volatile non-transitory storage medium stores an operating system and a computer program. The internal memory provides an environment for running of the operating system and the computer programs in the non-volatile non-transitory storage medium. The communication interface of the computer device is used for wired or wireless communication with an external terminal. The wireless communication may be realized by Wi-Fi, an operator network, near field communication (NFC), or other technologies. The computer program is executed by the processor to implement an obstacle detection method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 9:
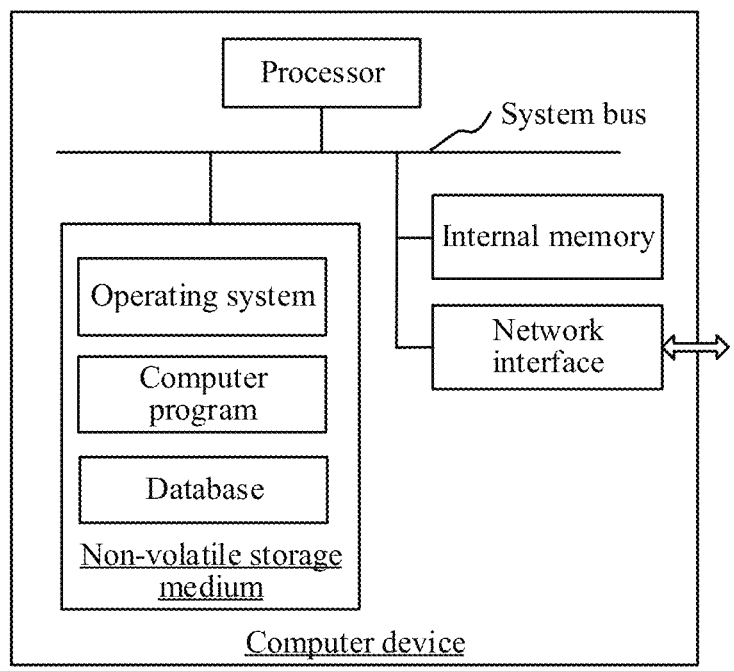
FIG. 9 is an internal structure diagram of a computer device according to an example embodiment.
Figure 10:
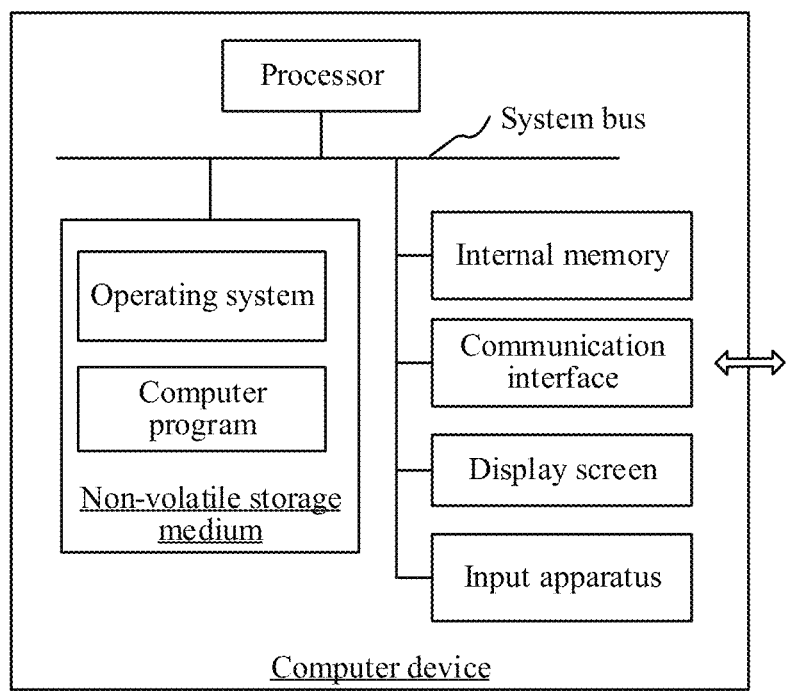
FIG. 10 is an internal structure diagram of a computer device according to an example embodiment.

A person skilled in the art may understand that the structure shown in FIG. 9 or FIG. 10 is a block diagram of a partial structure and does not limit the computer device to which the solution of this application is applied. For example, the computer device may include more or fewer components than those shown in the figure, or some components may be combined, or a different component deployment is used.

In some embodiment, a computer device is further provided, including a memory and one or more processors, the memory storing computer-readable instructions, the computer-readable instructions, when executed by the one or more processors, causing the one or more processors to perform the steps of the foregoing method embodiments.

In some embodiments, one or more non-volatile non-transitory readable storage media storing computer-readable instructions are provided, the computer-readable instructions, when executed by one or more processors, causing the one or more processors to perform the steps of the foregoing method embodiments.

In some embodiments, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium and executes the computer instructions to cause the computer device to perform the steps of the foregoing method embodiments.

A person of ordinary skill in the art may understand that all or some of procedures of the method in the foregoing embodiments may be implemented by a computer program by instructing relevant hardware. The program may be stored in a non-volatile non-transitory computer-readable storage medium. When the program is executed, the procedures of the foregoing method embodiments may be implemented. Any reference to a memory, a storage, a database, or another medium used in the embodiments provided in this application may include at least one of a non-volatile memory and a volatile memory. For example, the non-volatile memory may include a read-only memory (ROM), a hard disk, a flash memory, and an optical memory. The volatile memory may include a random access memory (RAM) or an external high-speed cache. The RAM may be available in a plurality of forms, such as a static RAM (SRAM), a dynamic RAM (DRAM), or the like.

The technical features in the above embodiments may be modified and/or combined in various manners. While not all possible combinations are described herein, it is to be understood that when combinations of the technical features described do not conflict with each other, such combinations are to be understood as falling within the scope of this specification.

The foregoing embodiments describe several implementations of this application, which are described in detail, but are not a limitation of the scope of the present disclosure. For a person of ordinary skill in the art, various modifications and combinations can be made without departing from the scope of this disclosure. Such modifications and combinations are within the scope of this disclosure.

What is claimed is:

1. An obstacle detection method, the method comprising:
    acquiring a road scene image of a road where a target vehicle is located;
    performing obstacle recognition on the road scene image to obtain region information and depth-of-field information corresponding to obstacles in the road scene image;
    determining target obstacles in an occlusion relationship based on the region information corresponding to each of the obstacles, and determining a relative depth-of-field relationship between the target obstacles based on the depth-of-field information of the target obstacles;
    acquiring a ranging result of each of the obstacles collected by a ranging apparatus corresponding to the target vehicle; and
    determining, based on the relative depth-of-field relationship between the target obstacles and the ranging result of each of the obstacles, an obstacle detection result corresponding to the road where the target vehicle is located;
    wherein the determining target obstacles in the occlusion relationship comprises:
        acquiring a candidate region corresponding to each of the obstacles based on the region information corresponding to each of the obstacles during the obstacle recognition;
        calculating an overlapping ratio between the candidate regions corresponding to each of the obstacles; and
        determining that the target obstacles in an occlusion relationship are the obstacles corresponding to the candidate regions with the overlapping ratio greater than an overlapping ratio threshold.

2. The method according to claim 1, wherein the acquiring the road scene image comprises:
    receiving, when the target vehicle is in an automated driving state, the road scene image transmitted by an image capture apparatus corresponding to the target vehicle, the road scene image being an image of the road where the target vehicle is located captured by the image capture apparatus.

3. The method according to claim 1, wherein the performing obstacle recognition on the road scene image comprises:
    inputting the road scene image to an obstacle recognition model, the obstacle recognition model comprising a feature extraction network, an instance segmentation network, and a depth-of-field prediction network;
    performing, using the feature extraction network, feature extraction on the road scene image to obtain a plurality of feature maps corresponding to different scales;
    performing, using the instance segmentation network, instance segmentation on the plurality of feature maps of different scales, to obtain the region information corresponding to each of the obstacles in the road scene image; and
    performing, using the depth-of-field prediction network, depth-of-field prediction on each of the obstacles based on the region information corresponding to each of the obstacles to obtain the depth-of-field information corresponding to each of the obstacles.

4. The method according to claim 3, wherein the feature extraction network comprises a feature extraction backbone network and a feature pyramid network (FPN), and the performing feature extraction on the road scene image comprises:
    inputting the road scene image to the feature extraction backbone network for processing by convolutional network layers of different scales in the feature extraction backbone network, to obtain a plurality of backbone feature maps corresponding to different scales; and
    inputting the plurality of backbone feature maps to the FPN for processing by the FPN to obtain a plurality of feature maps corresponding to different scales.

5. The method according to claim 3, wherein the instance segmentation network comprises a region proposal network (RPN), a target classification network, and a target segmentation network, and the performing instance segmentation on the plurality of feature maps of different scales comprises:

inputting the plurality of feature maps of different scales to the RPN for processing by a convolutional network layer of a preset scale in the RPN to obtain candidate regions corresponding to the feature maps;

predicting, using the target classification network, an obstacle class corresponding to each of the candidate regions; and performing instance segmentation on the candidate regions based on the predicted obstacle classes of the candidate regions to obtain region information corresponding to each of the obstacles.

6. The method according to claim 1, wherein the determining the relative depth-of-field relationship between the target obstacles comprises:

sorting the target obstacles by distance based on the depth-of-field information of the target obstacles to obtain a corresponding depth-of-field sorting result; and determining the relative depth-of-field relationship between the target obstacles based on the depth-of-field sorting result.

7. The method according to claim 1, wherein the ranging apparatus comprises at least one of a camera or a radar, and the acquiring the ranging result of each of the obstacles comprises:

acquiring ranging data collected by the ranging apparatus corresponding to the target vehicle;

preprocessing the ranging data in a manner matching the ranging apparatus to obtain preprocessed ranging data; and performing distance estimation on the preprocessed ranging data using a distance prediction model matching the ranging apparatus to obtain the ranging result of each of the obstacles.

8. The method according to claim 1, wherein the determining the obstacle detection result comprises:

determining a hazard level of each of the obstacles based on the ranging result of each of the obstacles and the relative depth-of-field relationship between the target obstacles; and determining the obstacle detection result is at least one of the relative depth-of-field relationship between the target obstacles, the ranging result of each of the obstacles, or the hazard level of each of the obstacles.

9. The method according to claim 8, wherein the determining a hazard level of each of the obstacles comprises:

determining an original hazard level corresponding to each of the obstacles based on the ranging result of each of the obstacles;

correcting the original hazard levels of the target obstacles based on the relative depth-of-field relationship between the target obstacles to obtain corrected hazard levels; and determining, based on the original hazard levels and the corrected hazard levels of the target obstacles, a hazard level corresponding to each of the obstacles.

10. A computer device comprising at least one processor and at least one memory, the at least one memory storing computer-readable instructions, the computer-readable instructions, when executed by the at least one processor, cause the at least one processor to:

acquire a road scene image of a road where a target vehicle is located;

perform obstacle recognition on the road scene image to obtain region information and depth-of-field information corresponding to obstacles in the road scene image;

determine target obstacles in an occlusion relationship based on the region information corresponding to each of the obstacles, and determine a relative depth-of-field relationship between the target obstacles based on the depth-of-field information of the target obstacles;

acquire a candidate region corresponding to each of the obstacles based on the region information corresponding to each of the obstacles during the obstacle recognition;

calculate an overlapping ratio between the candidate regions corresponding to each of the obstacles;

determine that the target obstacles in an occlusion relationship are the obstacles corresponding to the candidate regions with the overlapping ratio greater than an overlapping ratio threshold;

acquire a ranging result of each of the obstacles collected by a ranging apparatus corresponding to the target vehicle; and determine, based on the relative depth-of-field relationship between the target obstacles and the ranging result of each of the obstacles, an obstacle detection result corresponding to the road where the target vehicle is located.

11. The computer device according to claim 10, further configured to:

receive, when the target vehicle is in an automated driving state, the road scene image transmitted by an image capture apparatus corresponding to the target vehicle, the road scene image being an image of the road where the target vehicle is located captured by the image capture apparatus.

12. The computer device according to claim 10, further configured to:

input the road scene image to an obstacle recognition model, the obstacle recognition model comprising a feature extraction network, an instance segmentation network, and a depth-of-field prediction network;

perform feature extraction on the road scene image using the feature extraction network to obtain a plurality of feature maps corresponding to different scales;

perform instance segmentation on the plurality of feature maps of different scales using the instance segmentation network to obtain the region information corresponding to each of the obstacles in the road scene image; and perform depth-of-field prediction on each of the obstacles based on the region information corresponding to each of the obstacles by using the depth-of-field prediction network to obtain the depth-of-field information corresponding to each of the obstacles.

13. The computer device according to claim 12, wherein the feature extraction network comprises a feature extraction backbone network and a feature pyramid network (FPN), and the computer device is further configured to:

input the road scene image to the feature extraction backbone network for processing by convolutional network layers of different scales in the feature extraction backbone network to obtain a plurality of backbone feature maps corresponding to different scales; and input the plurality of backbone feature maps to the FPN for processing by the FPN to obtain a plurality of feature maps corresponding to different scales.

14. The computer device according to claim 12, wherein the instance segmentation network comprises a region proposal network (RPN), a target classification network, and a target segmentation network, and computer device is further configured to:
- input the plurality of feature maps of different scales to the RPN for processing by a convolutional network layer of a preset scale in the RPN to obtain candidate regions corresponding to the feature maps;
- predict, using the target classification network, an obstacle class corresponding to each of the candidate regions; and
- perform instance segmentation on the candidate regions based on the predicted obstacle classes of the candidate regions to obtain region information corresponding to each of the obstacles.

15. The computer device according to claim 10, further configured to:
- sort the target obstacles by distance based on the depth-of-field information of the target obstacles to obtain a corresponding depth-of-field sorting result; and
- determine the relative depth-of-field relationship between the target obstacles based on the depth-of-field sorting result.

16. The computer device according to claim 10, wherein the ranging apparatus comprises at least one of a camera or a radar, and the computer device is further configured to:
- acquire ranging data collected by the ranging apparatus corresponding to the target vehicle;
- preprocess the ranging data in a manner matching the ranging apparatus to obtain preprocessed ranging data; and
- perform distance estimation on the preprocessed ranging data using a distance prediction model matching the ranging apparatus to obtain the ranging result of each of the obstacles.

17. The computer device according to claim 10, further configured to:
- determine a hazard level of each of the obstacles based on the ranging result of each of the obstacles and the depth-of-field relationship between the obstacles; and
- determine the obstacle detection result is at least one of the relative depth-of-field relationship between the target obstacles, the ranging result of each of the obstacles, or the hazard level of each of the obstacles.

18. The computer device according to claim 17, further configured to:
- determine an original hazard level corresponding to each of the obstacles based on the ranging result of each of the obstacles;
- correct the original hazard levels of the target obstacles based on the relative depth-of-field relationship between the target obstacles to obtain corrected hazard levels; and
- determine, based on the original hazard levels and the corrected hazard levels of the target obstacles, a hazard level corresponding to each of the obstacles.

19. A non-transitory computer readable storage medium storing at least one instruction, at least one program, a code set, or an instruction set, the at least one instruction, the at least one program, the code set, or the instruction set being loaded and executed by at least one processor, causing the at least one processor to perform an obstacle detection method comprising:
- acquiring a road scene image of a road where a target vehicle is located;
- performing obstacle recognition on the road scene image to obtain region information and depth-of-field information corresponding to obstacles in the road scene image;
- determining target obstacles in an occlusion relationship based on the region information corresponding to each of the obstacles, and determining a relative depth-of-field relationship between the target obstacles based on the depth-of-field information of the target obstacles;
- acquiring a ranging result of each of the obstacles collected by a ranging apparatus corresponding to the target vehicle; and
- determining, based on the relative depth-of-field relationship between the target obstacles and the ranging result of each of the obstacles, an obstacle detection result corresponding to the road where the target vehicle is located;
- wherein the determining target obstacles in the occlusion relationship comprises:
  - acquiring a candidate region corresponding to each of the obstacles based on the region information corresponding to each of the obstacles during the obstacle recognition;
  - calculating an overlapping ratio between the candidate regions corresponding to each of the obstacles; and
  - determining that the target obstacles in an occlusion relationship are the obstacles corresponding to the candidate regions with the overlapping ratio greater than an overlapping ratio threshold.

20. The non-transitory computer readable storage medium of claim 19, the obstacle detection method further comprising:
- sorting the target obstacles by distance based on the depth-of-field information of the target obstacles to obtain a corresponding depth-of-field sorting result; and
- determining the relative depth-of-field relationship between the target obstacles based on the depth-of-field sorting result.

* * * * *